May 29, 1923.
B. W. MORTON
1,456,815
PLOW ATTACHMENT FOR TRACTORS
Filed Dec. 31, 1921
2 Sheets-Sheet 1
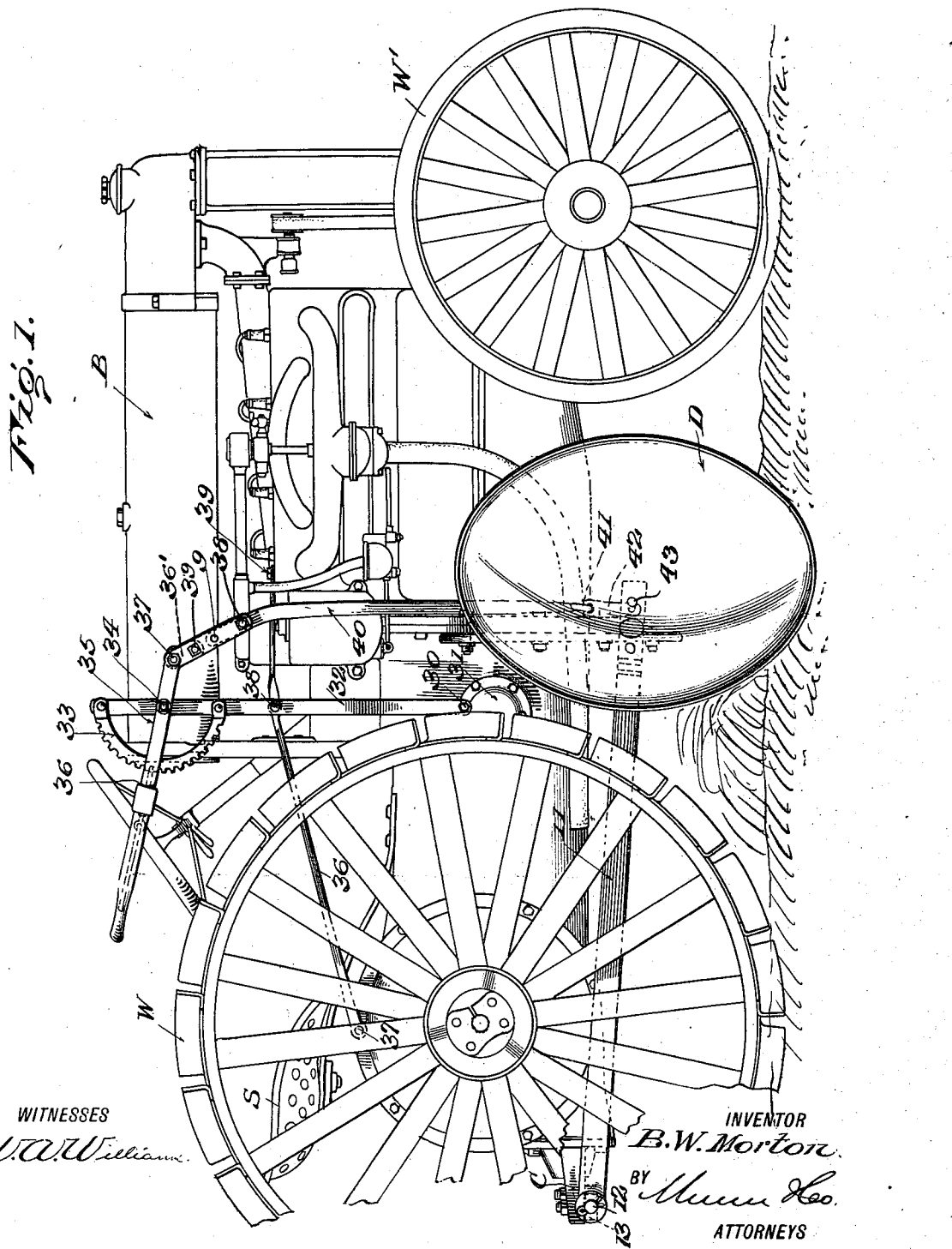
WITNESSES
INVENTOR
B. W. Morton
BY
ATTORNEYS

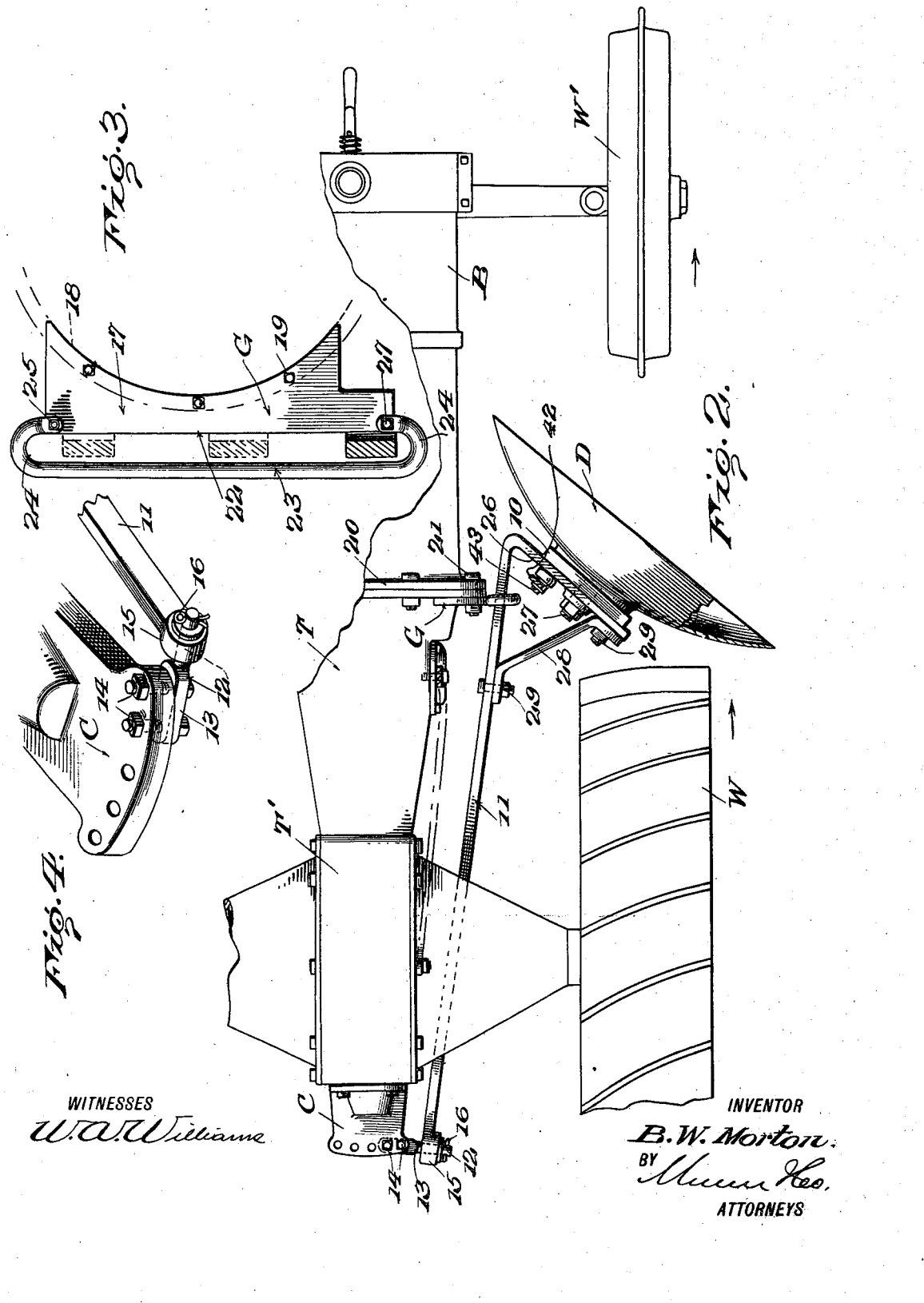

Patented May 29, 1923.

1,456,815

UNITED STATES PATENT OFFICE.

BENJIMAN W. MORTON, OF WILLISTON, FLORIDA.

PLOW ATTACHMENT FOR TRACTORS.

Application filed December 31, 1921. Serial No. 526,262.

*To all whom it may concern:*

Be it known that I, BENJIMAN W. MORTON, a citizen of the United States, and a resident of Williston, in the county of Levy and State of Florida, have invented certain new and useful Improvements in Plow Attachments for Tractors, of which the following is a specification.

This invention relates to tractors and more particularly to a plow attachment therefor.

The object of the invention is to provide an attachment of the above character which may be quickly attached to a tractor in a position that it may be easily observed during operation by the driver or operator of the tractor.

It is also an object of the invention that the plow be adapted to make a relatively broad cut or furrow each operation.

Another object of the invention is that the plow attachment be particularly adapted for operating upon ground where roots or other obstructions are to be contended with.

A still further object of the invention is that the attachment be adapted to be connected with any standard type of tractor and without changing the construction of the tractor.

It is also an object of the invention that the attachment be simple in construction and inexpensive to manufacture.

Other objects and advantages relating to details of construction, combination and arrangement of parts will hereinafter appear in the detailed description to follow.

The invention is illustrated by way of example in the accompanying drawings, in which, Figure 1 is a view in side elevation of a tractor showing the invention applied.

Figure 2 is a fragmentary plan view of the same.

Figure 3 is a detail side elevation illustrating the combined guide and keeper means for the plow attachment.

Figure 4 is a detail perspective view illustrating the manner in which the push bar of the plow attachment is connected with the draw bar of the tractor.

Like reference numerals refer to similar parts throughout the drawings.

For the sake of facilitating the reading of the drawings it may be here stated that the tractor shown is of the so-called Fordson type. However, it is to be understood that the application of my invention is not to be limited to this particular type of tractor.

Referring to the drawings, B indicates the body of the tractor, W the rear supporting and drive wheels and W' the front wheels. As shown best in Figure 2 T indicates the transmission housing, T' the differential housing and C the draw bar cap.

In carrying out the present invention there is provided a plow disc D which may be of any diameter and which should be formed with an enlarged boss 10. As shown in the different figures of the drawing, the disc D is positioned intermediate a rear and front wheel on one side of the tractor and should assume the angular position shown. For supporting this disc and causing the same to move with the tractor I provide a push bar generally indicated by the reference numeral 11. The push bar 11 is of relatively great strength and its rear end is pivotally connected to the draw bar cap C through the link element 12. The link element 12 has its one end portion 13 flattened and provided with two openings through which the bolts 14 may be extended for rigidly securing the same to the draw bar cap C. The outer end of the element 12 is pointed and adapted to extend through an eye 15 formed upon the rear end of the push bar 11. Also there is extended through the outer end of the element 12 a keeper pin 16 whereby the push bar is held against removal.

The forward end of the push bar 11 is held by vertical swinging movement by what may be termed a combined guide and keeper member generally indicated by the reference character G. The member G consists in a plate portion 17, one edge of which is arcuate in shape as indicated at 18. This edge is also formed with a plurality of openings as at 19. The edge 18 is complementary to the curvature of the transmission housing T and adapted to fit thereon as best illustrated in Figure 2. The openings 19 are in alinement with the bolted flanges of the transmission housing as at 20 and adapted to receive flange bolts 21 whereby the same may be secured to the transmission housing. The outer edge 22 of the plate member 17 is straight as shown in Figure 3 and to the plate there is secured a bar 23 which has each end formed with a hook as at 24, and said hook being in each instance secured to the plate 17 by the means of a bolt as at 25. Between the bar 23 and the outer edge 22 of the plate 17 is disposed the push bar 11 and adapted to move freely upwardly and downwardly.

The push bar 11 has a forward end portion 26 which is bent rearwardly and at an angle to the push bar. A suitable bolt 27 is extended through the boss 10 of the plow disc D and also extended through the bent portion 26 of the push bar 11 whereby the plow disc D is rotatably held. Also there is extended between the draw bar 11 and the outer end of its bent portion 26 a brace member 28, said member being secured at each of its ends by the bolts 29.

In order to adjustably lower and raise the plow disc D I provide the following mechanism: By the means of a flanged bolt 30 which serves for securing the cover plate 31 to close the opening in the transmission housing for the belt pulley usually accompanying a tractor of this type I attach one end of a supporting bar 32. At the upper end of this bar there is secured a rachet sector 33, also there is fulcrumed as at 34 to the bar 32 a lever bar 35, said lever bar carrying a suitable pawl and spring mechanism as at 36 adapted to engage with the teeth of the ratchet sector 33 for adjustably holding the lever in turning position. To the forward end of the lever bar 35 there is rigidly secured a pair of members 36' by the means of a bolt 37. These members are further secured to each other by a bolt 39 and between the free ends of these members there is disposed the upper end portion of a bar 40. The bar 40 is pivotally connected to the members 36' by a bolt 38 and a shearing pin 9, and the lower end of bar 40 is formed with a hook 41 which is extended through an eye formed in the upper end of a link member 42. The link member 42 is secured by the means of a bolt as at 43 to the forward end of the push bar 11. It should be pointed out that the rear end of the lever bar 35 is within convenient reach of an operator when seated upon the seat S of the tractor.

In use of the present attachment for tractors, assuming that the same has been attached as illustrated in the drawings and it is desired to use the same for breaking a field, the disc D is preferably positioned as shown and at this angle performs its best service. The push bar 11 serves to push the disc D ahead of the drive wheels W of the tractor and the action which takes place is similar to a combined scraping and cutting action of the disc. The disc rotates and will turn over the soil in quite an efficient manner and will make a relatively broad furrow upon each operation. The breadth of the furrow of course is controlled by the diameter of the disc. It is also obvious that by pushing the disc forward in this manner that the same will at all times penetrate as deeply as permitted. In plowing the right and rear drive wheel W travels in the furrow and the forward wheels W' travel upon the solid ground, that is upon the inside of the furrow.

Should the disk D meet with an obstruction when the tractor is moving forwardly and the disk operating, the pin 9 will break and thus permit the disk D to move upwardly and over the obstruction. The lever bar 35 may be freely used by the operator at all times to adjust the depth at which it is desired the disc penetrate the earth. Also this may be used to lift the disc a sufficient height so that the tractor may be driven to different places without the use of the plow. The connection between the draw cap C and push bar 11 therefore permits free upward swinging movement of the front end of the push bar.

It is here to be observed that by placing the disc plow D in the position illustrated the same is always in view of the operator of the tractor and this is an apparent advantage.

While I have herein shown and described a particular type of disc plow attached to a tractor it is to be understood that I am aware of the fact that other types of plows might be used with equal advantage and that I am not to be limited to the particular type of plow shown as indicated by the appended claims.

What I claim is:

1. In combination with a tractor, a push bar, means whereby the one end of said push bar may be detachably and pivotally connected to the draw bar coupling of said tractor, a disk plow rotatably supported by the forward end of said push bar, and a slotted plate carried by said tractor through which the forward end of said push bar may extend whereby the push bar is held against lateral movement.

2. In combination with a tractor, a push bar, means whereby the one end of said push bar may be pivotally and detachably connected to the draw bar coupling of said tractor, a lateral extension at the forward end of said push bar, a disk plow rotatably supported by said lateral extension, and a brace extending between said lateral extension and the push bar.

3. In combination with a tractor, a bar pivotally connected to the tractor and extending forwardly with relation to said tractor, a plow carried at the forward end of the bar and disposed to operate forward to a drive wheel of said tractor, and means carried by the tractor adapted to cooperate with said bar to maintain the plow in its operative position.

4. In combination with a tractor, a bar pivotally connected to said tractor and extending forwardly with relation thereto, means carried at the forward end of the bar whereby a plow may be mounted and disposed in offset relation to the longitudinal axis of the bar, and means carried by the tractor adapted to cooperate with the bar for maintaining the plow in its operative position.

5. In combination with a tractor, a bar pivotally connected to said tractor and extending forwardly with relation thereto, means whereby a disk plow may be rotatably supported at the forward end of said push bar and in offset relation with respect to the longitudinal axis of the push bar, and guide means carried by the body of said tractor adapted to cooperate with the push bar for maintaining the plow in its operative position.

6. In combination, a tractor, a bar having its one end pivotally connected to the tractor and extending forwardly with relation to said tractor, a frame carried at the forward end of the bar and occurring upon one side thereof, a disk wheel rotatably supported by said frame and disposed to operate forward to a drive wheel of said tractor, and guide means carried by the tractor adapted to cooperate with a push bar for maintaining the plow in its operative position.

7. In combination with a tractor, a bar having its one end pivotally connected to said tractor and extending forwardly with relation to the tractor, laterally disposed means at the forward end of the bar whereby a disk plow may be rotatably supported, said disk plow being disposed to operate immediately forward to a wheel of said tractor and at an angle to the longitudinal axis of the tractor, and means carried by the tractor adapted to cooperate with the push bar for maintaining the push bar in its operative position.

8. In combination with a tractor, a bar having its one end pivotally connected to said tractor and extending forwardly with relation thereto, a disk plow rotatably supported at the forward end of said bar and disposed to press inwardly upon the last named end of the bar when brought into operation, and means carried by the body of the tractor adapted to serve as a stop against the inward pressure of the disk plow and also serve to permit upward or downward movement of said disk plow.

9. In combination with a tractor, a bar having its one end pivotally connected to said tractor and extending forwardly with relation thereto, a disk plow rotatably supported at the forward end of said bar and disposed to press inwardly upon the last named end of the bar when brought into operation, means carried by the body of the tractor adapted to serve as a stop against the inward pressure of the disk plow and also serve to permit upward or downward movement of said disk plow, and means for manually raising and lowering said plow.

10. In combination with a tractor of the character described, a stub shaft detachably secured to the draw bar coupling of said tractor, a bar having its one end journaled upon said stub shaft and extending forwardly with relation to the tractor, a guide member carried by the body of the tractor through which the bar extends, and a plow supported at the forward end of said bar, said plow being disposed to press inwardly when brought to its operative position, said guide member being adapted to serve as a stop against inward movement of the plow and also permit vertical movement of said plow.

11. In combination with a tractor of the character described, a bar having its one end detachably and pivotally connected to the draw bar coupling of said tractor, a plate having an inner arcuate edge adapted to fit about the body of the tractor, means for detachably securing the plate in position, means secured to the plate adapted to prevent outward movement of the forward end of the bar and also limit the upward and downward movement thereof, a laterally extending projection at the forward end of the bar, and a disk plow rotatably supported by said lateral projection.

BENJIMAN W. MORTON.